June 21, 1949. N. EASTMAN 2,473,870
PRY OFF TYPE JAR CAP REMOVER
Filed Feb. 8, 1945
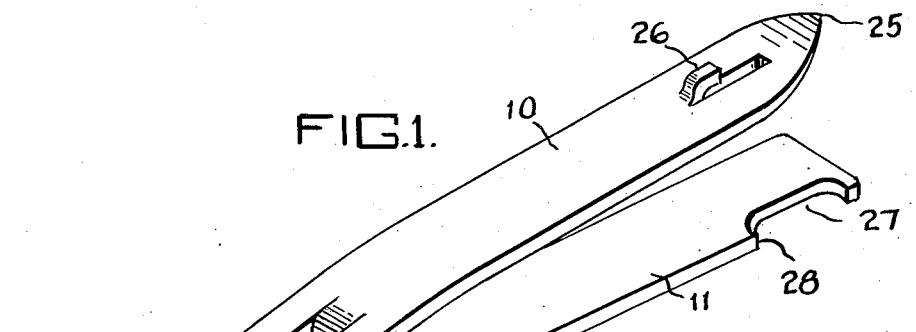
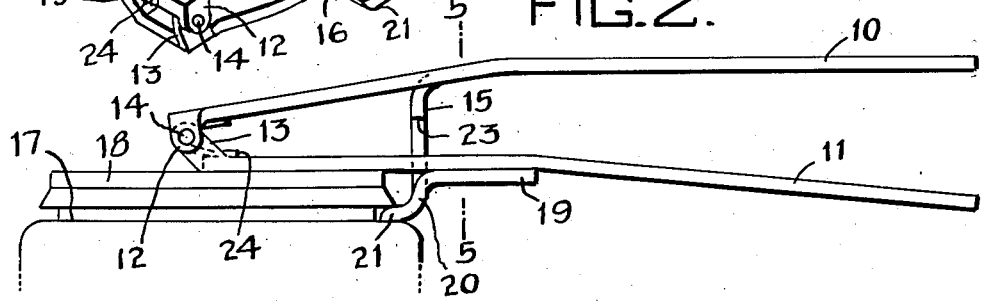
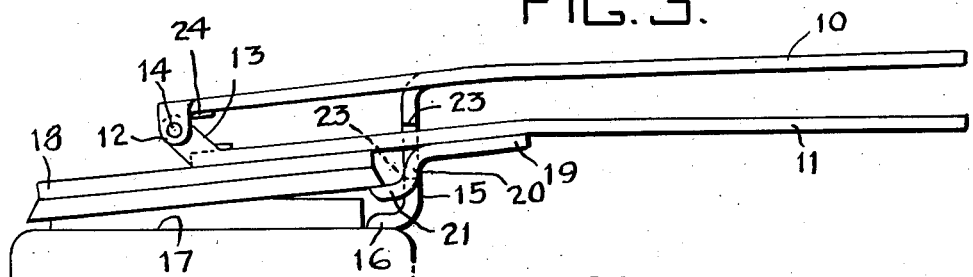
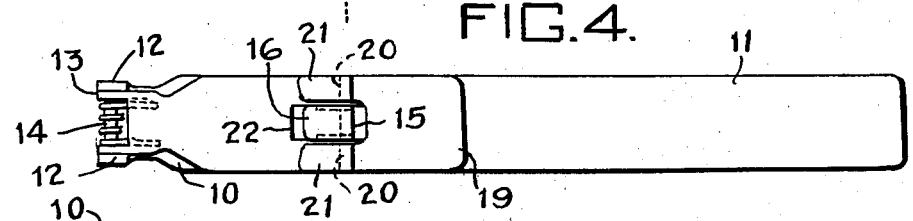
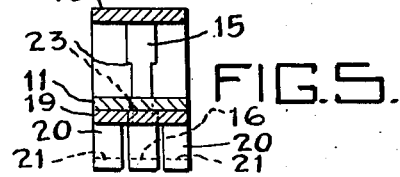
INVENTOR
NATHANIEL EASTMAN
BY
ATTORNEY Patented June 21, 1949

2,473,870

UNITED STATES PATENT OFFICE 2,473,870

PRY OFF TYPE JAR CAP REMOVER

Nathaniel Eastman, New York, N. Y., assignor to New England Plastic Co. Inc., Leominster, Mass., a corporation of Massachusetts Application February 8, 1945, Serial No. 576,807

2 Claims. (Cl. 81—3.36)

The invention relates to a jar opener and particularly to an opener of the type adapted to remove vacuum or hermetically sealed covers from jars or bottles.

It is well known that a great deal of difficulty is often encountered in prying off or removing the covers of the largely used vacuum type of jars. In removing the covers they are often bent out of shape and become useless for recovering the jar should the product thereof be not consumed.

The principal object of the present invention is to provide an opener for a vacuum sealed jar by means of which the cover may be removed quickly with the greatest of ease and a minimum amount of effort. In removing the cover with an opener made in accordance with the present invention it is not in any way mutilated or bent out of shape and may be snapped back on the jar repeatedly until the contents thereof have been entirely used up or if it should be desired to place something different in the jar.

A further object of the invention is to provide an opener which is extremely durable and efficient and one which has very few parts, the parts being of most simple design, thus permitting of substantial economies in manufacturing and assembling so that the article may be marketed at low cost.

The invention will be fully described in the following specification and illustrated in the accompanying drawing forming a part thereof and in which a preferred form of the invention is illustrated:

Fig. 1 is a perspective view of the opener;

Fig. 2 is a side or edge view, the opener being applied to the jar and the jar cover being in its closed position;

Fig. 3 is a view similar to Fig. 2 showing the cover in the process of being removed;

Fig. 4 is a bottom plan view; and

Fig. 5 is a detail cross sectional view taken on the line 5—5 of Fig. 2.

Referring again to said drawings the opener comprises a pair of members or handle portions 10 and 11 which are preferably fabricated from flat sheet metal stock. The upper handle portion 10 has a pair of depending ears 12 and the lower handle portion 11 has a pair of mating ears 13. A pin 14 passes through aligned openings in the ears 12 and 13 and functions as a pivot or hinge for the handle portions.

The upper handle portion 10 has a depending foot 15 punched from the body thereof and this foot has a toe 16 extending at right angles thereto. In the operation of the opener when removing a cover from a jar, the toe 16 rests on the shoulder 17 of the jar between the shoulder and the cover 18.

The lower handle portion 11 has a plate 19 resistance welded or otherwise secured thereto. This plate has a pair of depending projections 20—20 which have fingers 21—21 extending at right angles thereto on either side of the toe 16. From an inspection of Fig. 2 it will be seen that the fingers 21—21 also rest on the shoulder 17 of the jar, between the shoulder and the cover 18 prior to removal of the cover.

As illustrated in Fig. 3 when it is desired to remove the cover 18 the handle portions 10 and 11 are pressed together. The toe 16 remains in contact with the shoulder 17 of the jar and the fingers 21—21 engage the under edge of the cover and lift or pry it from the jar without in any way mutilating or bending it. During the lifting operation that part of the handle portion adjacent the hinge 14 remains in contact with the top of the cover. It will thus be apparent that the cover is easily and quickly removed with a minimum amount of effort and may be replaced or repositioned again at any time desired.

The foot 15 passes through an opening 22 in the lower handle portion 11 and has its side portions slightly cut out to form shoulders 23 which act as stops to limit the movement of the handle portions in relation to each other. In assembling the opener the foot 15 and its toe 16 are passed through the larger part of the opening 22 and then slid back into the narrower portion which is the same width as the distance between the cut out portions of the foot.

When the parts are in the position of Fig. 2 the lower handle portion 11 engages the lower shoulder 23 and the toe 16 and fingers 21—21 are all in line to permit of their entry between the shoulders 17 and the cover 18. They are normally held in this position by a spring 24 which surrounds the pivot pin 14 and urges the handle portions away from each other.

As shown in Fig. 1 the upper handle portion 10 may be pointed as indicated at 25 and have an ear 26 struck up from it. This handle portion may then function as an implement for piercing can tops. The lower handle portion 11 may have a cutout 27 having a hook portion 28 at the end thereof to function as a bottle opener.

Changes in details of construction such as would occur to one skilled in the art are to be considered as coming within the spirit of the invention as set forth in the appended claims.

I claim:

1. An opener for jars of the type having a shoulder spaced from the edge of the cover skirt comprising a pair of spaced pivoted members, parts of which are formed to serve as handles, means for normally holding said members spaced apart, a foot depending from an intermediate portion of one of said members, the other of said members having an opening in line therewith, said foot projecting through said opening and terminating in a toe which is bent towards the pivotal connection of said members and a projection on the other member beside the part of said foot which projects beyond said opening, said projection terminating in a finger which also extends towards the pivotal connection of said members, said toe and finger being of a thickness to be inserted between said jar shoulder and the edge of the cover skirt, whereby movement of the handles toward each other will cause the toe and finger to move away from each other and lift the caps from the jar.

2. The opener according to claim 1 wherein said foot has shoulders at the sides extending beyond the side edges of the other member to limit the movement of said members relative to each other.

NATHANIEL EASTMAN.

REFERENCES CITED

The following references are of record in the file of this patent:

UNITED STATES PATENTS

| Number | Name | Date |
|---|---|---|
| 8,878 | Taft | Apr. 13, 1852 |
| 124,129 | Gould | Feb. 27, 1872 |
| 129,412 | Jackson | July 16, 1872 |
| 326,909 | Kricker | Sept. 22, 1885 |
| 1,575,568 | Gerhart | Mar. 2, 1926 |
| 1,711,225 | Crowell | Apr. 30, 1929 |
| 1,948,096 | Cavanagh | Feb. 20, 1934 |